US006561128B1

(12) United States Patent
Carter

(10) Patent No.: US 6,561,128 B1
(45) Date of Patent: May 13, 2003

(54) BIRD FEEDER WITH SQUIRREL DETERRENT

(76) Inventor: Neil C. Carter, 301 W. Stadium Ave., Apt. #6, Lafayette, IN (US) 47906

( * ) Notice: Subject to any disclaimer, the term of this patent is extended or adjusted under 35 U.S.C. 154(b) by 0 days.

(21) Appl. No.: 10/120,625

(22) Filed: Apr. 11, 2002

(51) Int. Cl.[7] .............................................. A01K 39/01
(52) U.S. Cl. ................................... 119/57.9; 119/52.3
(58) Field of Search ............................. 119/57.9, 57.8, 119/52.2, 52.3, 52.4, 428, 429

(56) References Cited

U.S. PATENT DOCUMENTS

| | | | | |
|---|---|---|---|---|
| 2,891,508 A | * | 6/1959 | Bower | 119/52.3 |
| 4,031,856 A | * | 6/1977 | Chester | 119/57.9 |
| 4,646,686 A | * | 3/1987 | Furlani | 119/57.9 |
| 4,811,694 A | * | 3/1989 | Holmquist | 119/52.2 |
| 5,156,112 A | * | 10/1992 | Brown | 119/57.9 |
| 5,195,459 A | * | 3/1993 | Ancketill | 119/57.9 |
| 5,285,747 A | | 2/1994 | Caldine | |
| 5,355,835 A | * | 10/1994 | Freed | 119/57.9 |
| 5,568,789 A | * | 10/1996 | Koenig et al. | 119/57.9 |
| 5,720,238 A | * | 2/1998 | Drakos | 119/57.9 |
| 5,878,537 A | * | 3/1999 | Flischel | 52/101 |
| 5,894,813 A | | 4/1999 | George | |
| 5,937,788 A | * | 8/1999 | Boyd | 119/57.9 |
| 6,050,221 A | * | 4/2000 | Eaton et al. | 119/57.9 |
| 6,098,348 A | | 8/2000 | Weaver | |
| 6,119,627 A | * | 9/2000 | Banyas et al. | 119/57.9 |
| 6,145,477 A | * | 11/2000 | Jansen | 119/416 |
| 6,155,205 A | * | 12/2000 | Coates | 119/57.9 |
| 6,253,707 B1 | * | 7/2001 | Cote | 119/57.9 |
| 6,349,673 B1 | * | 2/2002 | Schumann | 119/52.2 |
| 6,401,658 B1 | * | 6/2002 | Teets | 119/57.9 |
| 6,418,878 B1 | * | 7/2002 | Cathell et al. | 119/52.3 |

* cited by examiner

*Primary Examiner*—Yvonne Abbott
(74) *Attorney, Agent, or Firm*—Marshall, Gerstein & Borun

(57) ABSTRACT

A bird feeder, including a method for deterring animals, is comprised of two sections, an upper section attached to a support structure, and a lower section attached to the upper section through a spring loaded member, where the weight of a bird causes little deflection of the spring, but the weight of a rodent such as a squirrel will cause the spring to deform, moving the lower piece in relation to the upper piece, thereby activating a mechanism to distress the squirrel, causing it to leave.

18 Claims, 4 Drawing Sheets

BIRD FEEDER WITH SQUIRREL DETERRENT

FIELD OF THE INVENTION

The present invention relates to bird feeders in general. More specifically, it relates to a bird feeder that provides a signal to scare off any pests that may be attempting to feed.

BACKGROUND OF THE INVENTION

Bird feeders are known in the art. Typically a bird feeder consists of a hollow tube that is filled with bird feed. The type of feed varies with the type of bird the user would like to attract. There are feed holes in the side of the tube through which the bird may access the feed. There are also perch points such as pegs placed adjacent to the feed holes so that the bird may stand on the perch point while feeding.

This is an effective design to attract birds to the feeder so that the user may enjoy the sight of the birds. However, other animals also are attracted to the easily-acquired food such as squirrels. Squirrels, being large in comparison to most birds, eat great amounts of the feed and scare away the birds. Thus, the user is deprived of the enjoyment of watching the birds eat. It is advantageous, then, to have an apparatus which allows birds to access the food but keeps squirrels and other undesirable animals away.

Several designs have been proposed. It is known to put a constant voltage across various locations on the bird feeder, at such a distance that only a large animal, such as a squirrel, would be able to close the circuit, thereby sustaining a mild shock. However, this has the disadvantage of producing a constant voltage potential, and the inherent danger that it presents. Also, a desirable large bird might close the circuit and receive a shock, thereby being driven away. It is also known to use a weight-activated mechanism, taking advantage of the greater weight of the squirrel compared to a typical bird, to block access to the food itself when the squirrel alights on the feeder, or to activate a motor which gyrates the feeder until the squirrel is thrown off.

DETAILED DESCRIPTION

Figure 1:
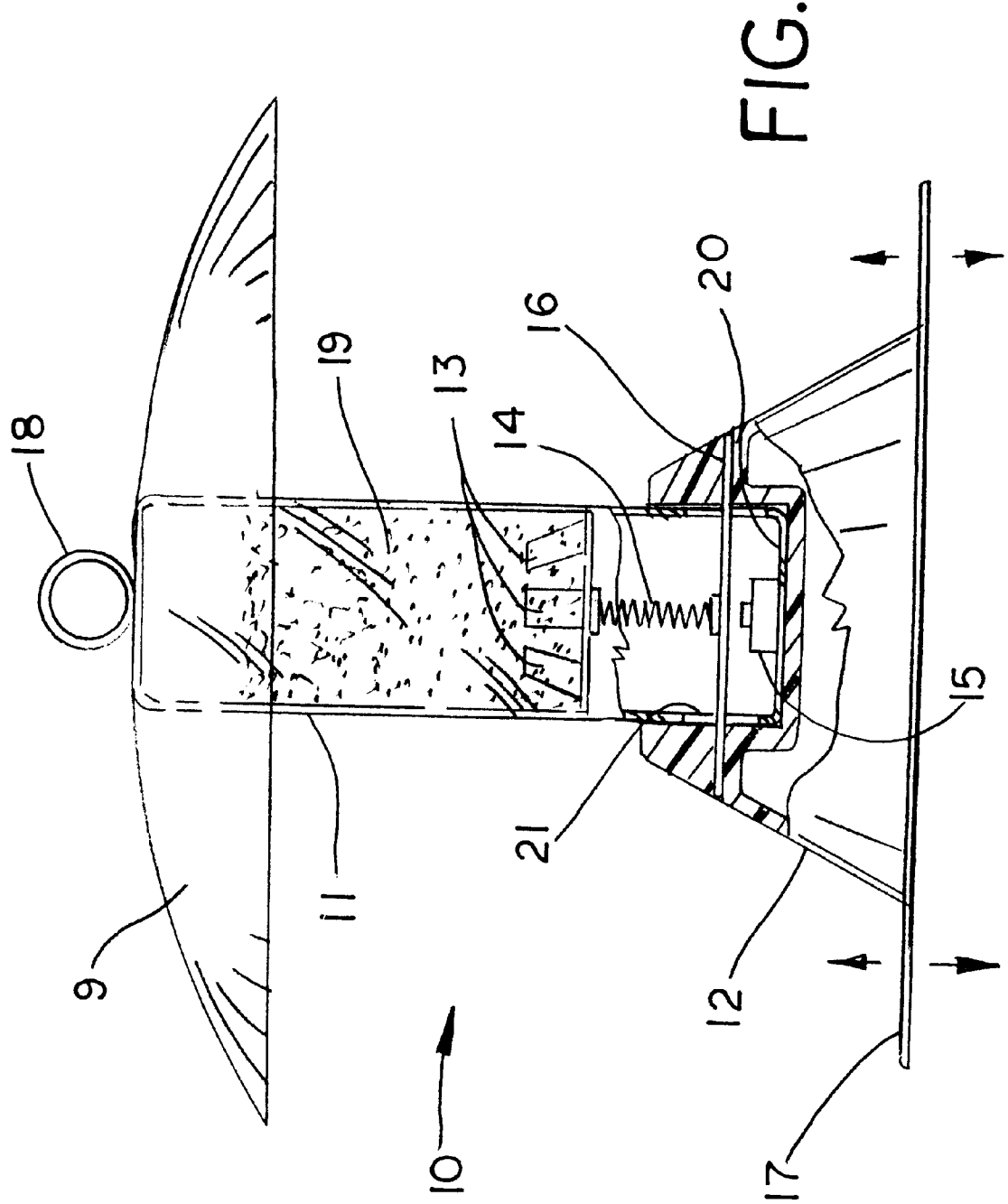
FIG. 1 illustrates a bird feeder constructed in accordance with an embodiment of the present invention.

Referring now to the drawings, bird feeder 10 is shown in an assembled condition. The feeder 10 is constructed of an upper section 11 and a lower section 12. The upper section 11 can include a hollow portion, and can be used to house the bird feed 19. It is also possible that the lower section 12 can be used to house the bird feed 19 (not shown). The upper section 11 can be of any cross sectional configuration, including circular, square, octagonal, etc. In the example shown in FIG. 1, the upper section 11 has a circular cross section. The upper section 11 has a bottom portion 20. Feed access holes 13 adjoin the upper section 11. These holes in the side of the upper section 11 are constructed large enough such that a bird will easily be able to access the feed inside.

The feeder 10 may be fastened to a support structure (not shown) using an adjustable ring or clasp 18. The support structure may be a tree branch or a post, for example. The clasp 18 may be connected to an umbrella 9. The umbrella 9 is releaseably attached to the upper section 11. This can be accomplished by threading complementary sections of the umbrella 9 and the upper section 11. The umbrella 9 serves as a cap to seal the interior of the upper section 11. The umbrella 9 can further be made large enough, with a sloping angle, and out of a slippery substance such that a squirrel will not be able to hang upside down and feed simultaneously.

The lower section 12 also has a hollow portion. It, too, can be of any cross sectional shape. In the present embodiment, the upper section 11 and lower section 12 are sized such that the upper section 11 can easily slide up and down inside the lower section 12. Adjoining the lower section 12 is a feed tray 17. The bird stands upon the tray 17 while feeding. Although the tray 17 is shown as a plate, it should be clear to one skilled in the art that any surface upon which a bird may alight is also useful. The tray 17 may also be moved up or down relative to the lower piece 12 and the feed holes 13 to account for a particular size or species of bird.

In an example not shown in the drawings, the lower section 12 can be configured to contain feed 19 and include feed holes.

The upper section 11 and the lower section 12 are capable of relative motion to each other via, for example a spring loaded member 14. In the present example, a coil spring is disclosed. The stiffness of the spring 14 is selected such that a bird, when alighting on the tray 17, causes very little expansion of the spring. However, when a squirrel or similar rodent alights on the tray 17, the spring 14 expands under the greater weight.

Attached to the bottom portion 20 of the upper section 11 is a signal generating device 15. Attached to the inside of the lower section 12 is a signal activation member 16. In FIG. 1, the signal activation member 16 is shown as a bar extending into and through the upper section 11 through slots 21. Signal generating device 15 can be battery powered, and if applicable, may automatically rewind. It can be any device known in the art such as a micro cassette tape player, a digital recorder, a programmable MP3 player, or any other device capable of emitting a signal.

It should be noted that although it is shown that the signal generating device 15 is attached to the upper section 11, and the signal activation member 16 is attached to the lower section 12, the converse would also function as well. Specifically, the signal generating device 15 can be attached to the lower section 12, and the signal activation member 16 can be attached to the upper section 11.

When the squirrel comes to rest on the tray 17, its greater weight causes the spring 14 to expand. The lower section 12 descends and brings the signal activation member 16 into contact with the signal generating device 15. This causes the signal generating device 15 to activate and it emits a sound that is distressing or frightening to the squirrel. After the squirrel departs, the spring 14 contracts and returns the lower section 12 to its original position. The signal activation member 16 ceases to be in contact with the signal generating device 15, and the distressing signal stops.

Figure 2:
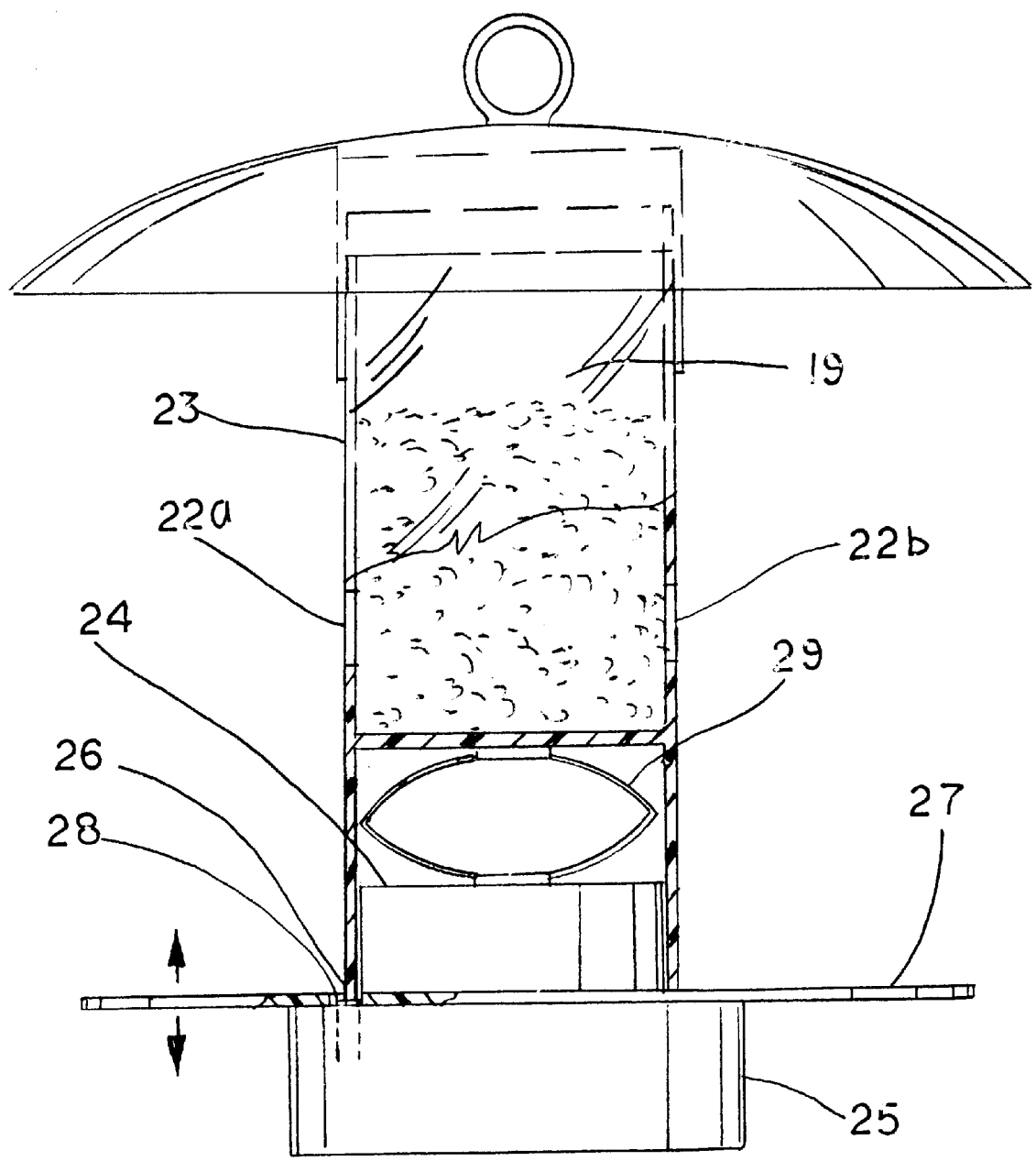
FIG. 2 illustrates a bird feeder constructed in accordance with another embodiment of the present invention.

FIG. 2 shows another example of the present invention. In this example, upper section 23 is shown larger in diameter than lower section 24. Again, upper section 23 and lower section 24 may be of any cross sectional shape, such as circular, square, octagonal, etc. Bird feed 19 is contained within the upper section 23. Feed holes 22a and 22b exist in the upper section 23 for the bird to access the bird feed 19. The spring mechanism 29 shown is a common pillow spring, although any similar structure could be used. The lower section 24 also includes a feed plate 27. The feed plate 27 serves as a perch point for the birds, as well as a mounting location for an ultrasonic source 25. Ultrasonic sources, known in the art to be another form of a signal generating device, repel rodents and/or insects, but do not affect birds or other household pets such as a dog. An example is PestContol PC01G from Lentek® which could easily be adapted for use in the present invention by those skilled in the art. The upper section 23 includes a peg 26, and the feed plate 27 includes a complementary aperture 28 through which the peg travels. While the peg 26 maintains contact with the ultrasonic source 25, the ultrasonic source 25 remains inactive.

A bird, with its relatively minimal weight, will not cause the spring 29 to expand. However, when a squirrel lands on the feed plate 27, its weight causes the spring 29 to expand. Peg 26 is then released from the ultrasonic source 25, causing it to emit a distressing signal, affecting only rodents and insects. In a further example, a peg may contact the ultrasonic source 25 to cause it to emit a distressing signal. When the squirrel departs, the spring returns the lower piece 24 to its original position, and peg 26 is returned to the ultrasonic source 25, causing it to cease operating.

Figure 3:
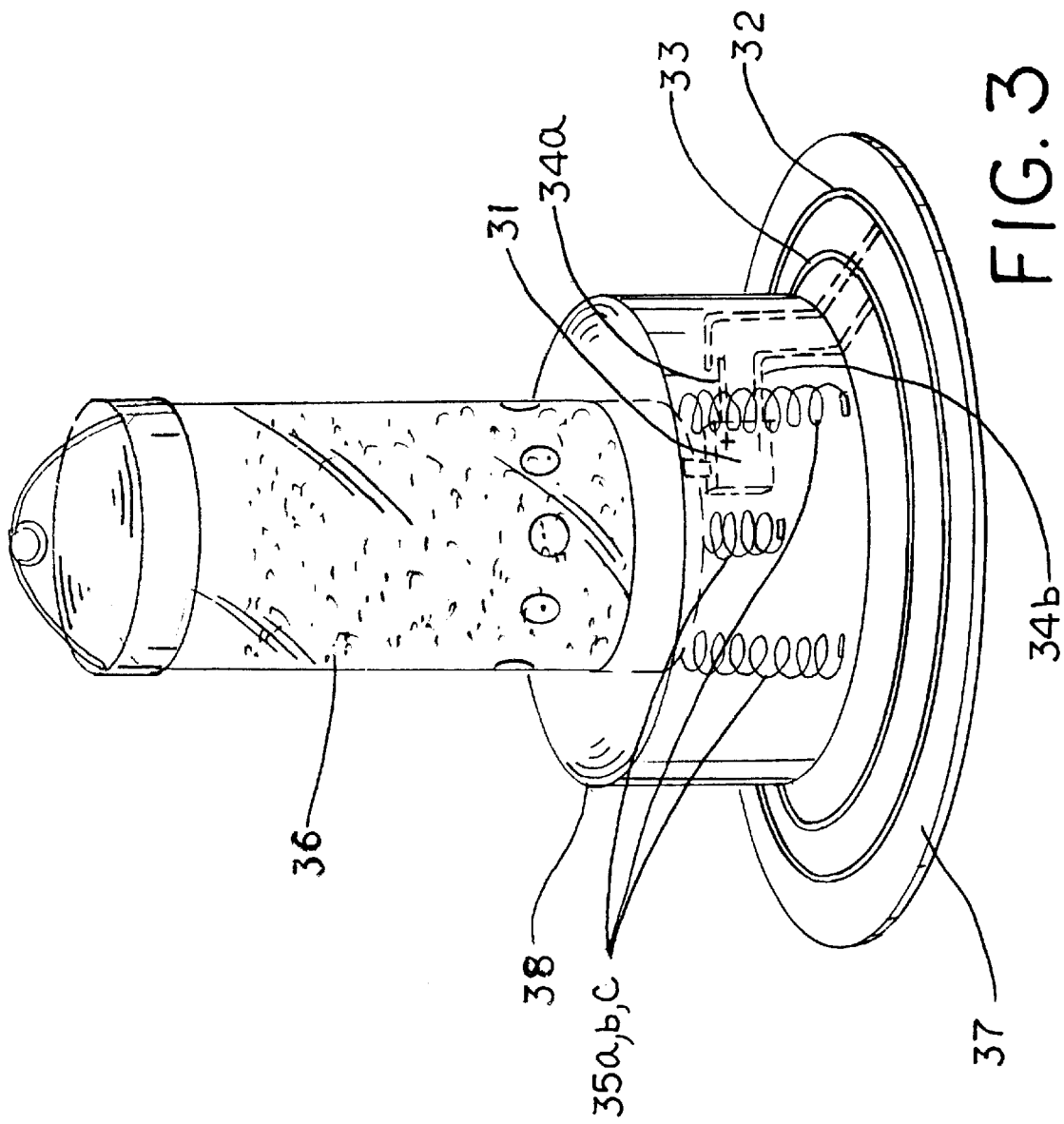
FIG. 3 illustrates a bird feeder constructed in accordance with a third embodiment of the present invention.

A further embodiment is shown in FIG. 3. Here, an electrical device such as a battery 31 is fastened to the underside of an upper section 36. The positive and negative terminals 34a and 34b are releasably connected to inlaid exposed wire on the feed plate 37. There is a positively charged wire 32 and a negatively charged wire 33. Again, when a bird alights on the feeder, no relative motion occurs between the upper section 36 and a lower section 38; the battery remains unconnected to the inlaid, exposed wires 32 and 33.

Once the squirrel settles on the feed plate 37, however, the springs 35a, 35b, and 35c expand, and the battery terminals 34a and 34b are connected to the wires 32 and 33. Although the wires 32 and 33 remain an open circuit, the squirrel standing on the feed plate 37 will likely complete the circuit with its body, thereby sustaining a mild shock. It is also possible to have one terminal permanently connected to minimize possibility of the connections missing, as shown in FIG. 3. Although only one set of exposed wires is shown, it may be desirable to add more sets of exposed wires in parallel, thereby increasing the chances that the squirrel will close the circuit.

Figure 4:
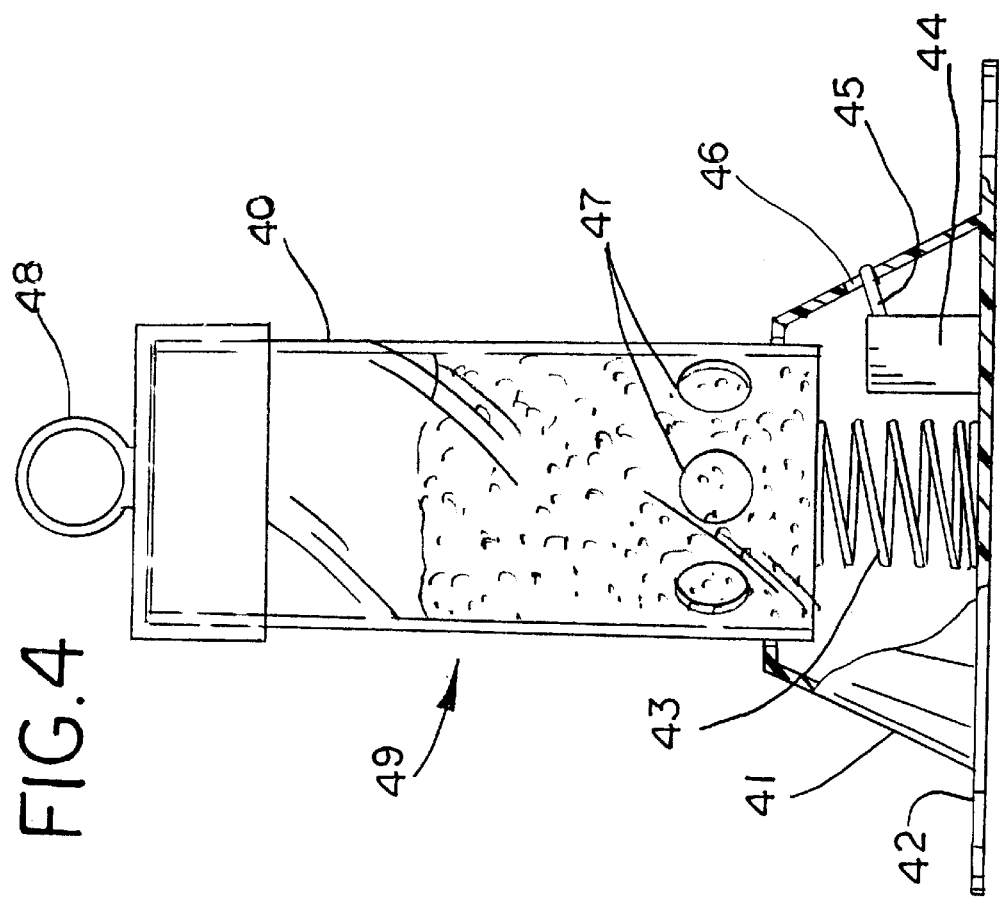
FIG. 4 illustrates a bird feeder constructed in accordance with a fourth embodiment of the present invention.

FIG. 4 discloses a fourth embodiment of the bird feeder 49. An upper section 40 is connected to a lower section 41 via a coil spring 43. Feed holes 47 are disposed in the upper section 40. A signal generating device 44 is mounted on the bottom of the upper section 40. Attached to the signal generating device 44 is an activation lever 45.

Disposed on the bottom section 41 is an activation slot 46. When the squirrel or other pest alights on the tray 42, the coil spring expands under the weight, and the activation slot 46 descends until it is brought into contact with the activation lever 45. The slot 46 then biases the lever 46, activating the signal generating device 44. Again, the signal generating device emits a sound that is frightening or distressing to a squirrel.

Figure 5:
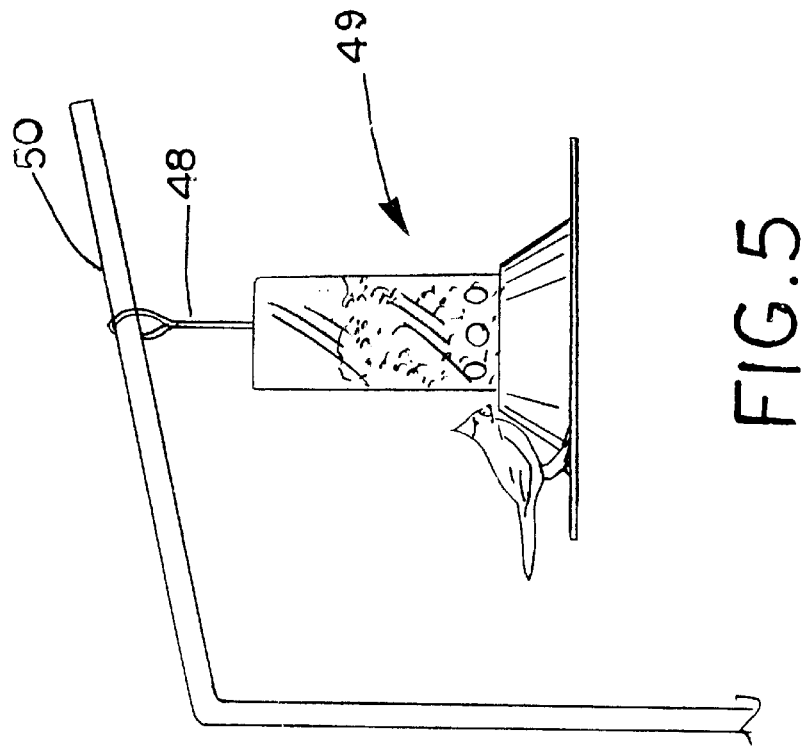
FIG. 5 illustrates the fourth embodiment of the invention in use.

FIG. 5 depicts the bird feeder 49 being used in nature, with the clamp 48 fastening the feeder to a pole 50.

The foregoing detailed description has been given for clearness of understanding only, and no unnecessary limitations should be understood therefrom, as modifications will be obvious to those skilled in the art.

What is claimed is:

1. An apparatus to feed birds comprising:

an upper section comprising a hollow member that is capable of containing feed;

a lower section being coupled to the upper section via a spring loaded member;

a deterrent activator adjoining the lower piece;

pest deterrent means mounted to the upper piece;

whereby an animal, weighing more than a bird typically using said apparatus, will cause sufficient relative motion between the upper and lower sections such that the deterrent activation means will activate the pest deterrent means.

2. The apparatus of claim 1, wherein the upper and lower sections are concentric.

3. The apparatus of claim 2, wherein the upper and lower sections are circular in cross section.

4. The apparatus of claim 1, wherein the spring loaded member is a coil spring.

5. The apparatus of claim 1, wherein the upper section contains feed holes.

6. The apparatus of claim 1, wherein the lower section contains feed holes.

7. The apparatus of claim 1, wherein the pest deterrent means comprises a digital recorder.

8. The apparatus of claim 1, wherein the pest deterrent means comprises an audio signal created by a micro cassette player.

9. The apparatus of claim 1, wherein the pest deterrent means comprises an audio signal created by an MP3 player.

10. The apparatus of claim 1, wherein the pest deterrent means comprises a device capable of emitting an ultrasonic frequency signal.

11. The apparatus of claim 1, further comprising a feed plate, wherein the pest deterrent means comprises a voltage potential across areas of the feed plate.

12. An apparatus to feed birds comprising:

an upper section and lower section;

the upper section comprising a hollow member capable of containing feed;

the lower section being coupled to the upper section via a spring loaded member;

the lower section including at least one perch point and a signal activation member; and a signal generating device mounted to the upper section;

whereby an animal, which is heavier than a bird typically using the apparatus, when exerting sufficient force on a perch point, will cause relative motion between the upper and lower sections such that the signal activation member will activate the signal generating device.

13. An apparatus to feed birds comprising:

complimentary upper and lower sections;

the upper section comprising a hollow member capable of containing feed;

the lower section being coupled to the upper section by connection means;

mounting means adjoining the lower section to allow birds to alight on the apparatus;

pest deterrent means to deter unwanted animals from the apparatus;

activation means to activate the pest deterrent means;

the connection means between the upper section and lower section biasing the deterrent activation means apart from the pest deterrent means;

whereby an animal, heavier than a bird typically using the apparatus, when settling on the mounting means causes sufficient relative motion between the upper and lower sections such that the activation means will activate the pest deterrent means.

14. A bird feeder, comprising, an upper section, a lower section coupled to the upper section via a spring-loaded member, a signal emitting device, a signal activation bar, whereby, an animal heavier than a typical bird using said apparatus causes sufficient relative motion between the upper and lower sections such that the signal activation bar will activate the signal emitting device.

15. The bird feeder of claim 14, wherein the upper section is capable of containing bird feed.

16. The bird feeder of claim 14, wherein the lower section is capable of containing bird feed.

17. The bird feeder of claim 14, wherein the signal emitting device emits an audio signal.

18. The bird feeder of claim 14, wherein the signal emitting device emits an ultrasonic signal.

* * * * *